US012619772B2

(12) United States Patent
Raju et al.

(10) Patent No.: US 12,619,772 B2
(45) Date of Patent: May 5, 2026

(54) SENSITIVE INFORMATION DISCLOSURE PREDICTION SYSTEM FOR SOCIAL MEDIA USERS AND METHOD THEREOF

(71) Applicants: Geetha Raju, Chennai (IN); Karthika Subbaraj, Chennai (IN); S. Bose, Chennai (IN); Poongodi Manoharan, Doha (QA)

(72) Inventors: Geetha Raju, Chennai (IN); Karthika Subbaraj, Chennai (IN); S. Bose, Chennai (IN); Poongodi Manoharan, Doha (QA)

( * ) Notice: Subject to any disclaimer, the term of this patent is extended or adjusted under 35 U.S.C. 154(b) by 259 days.

(21) Appl. No.: 18/455,301

(22) Filed: Aug. 24, 2023

(65) Prior Publication Data

US 2024/0005034 A1 Jan. 4, 2024

(51) Int. Cl.
*G06F 21/62* (2013.01)

(52) U.S. Cl.
CPC ................................ *G06F 21/6245* (2013.01)

(58) Field of Classification Search
CPC ....... G06F 21/60; G06F 21/62; G06F 21/6218
See application file for complete search history.

(56) References Cited

U.S. PATENT DOCUMENTS

| | | | | |
|---|---|---|---|---|
| 2021/0192651 A1* | 6/2021 | Groth | ........................ | G06N 3/09 |
| 2022/0207163 A1* | 6/2022 | Gentleman | ............. | G06F 21/62 |
| 2022/0309168 A1* | 9/2022 | Coulter | ................... | G06F 21/60 |
| 2023/0125983 A1* | 4/2023 | Baker | ................... | G06F 21/602 |
| | | | | 726/26 |

* cited by examiner

*Primary Examiner* — D'Arcy Winston Straub
(74) *Attorney, Agent, or Firm* — Perilla Knox & Hildebrandt LLP; Kenneth A. Knox

(57) ABSTRACT

The system comprises a feature extraction processor for extracting a set of features from user data; a sensitivity score calculation processor for calculating the sensitivity score using a machine learning technique; an SVM model for classifying the dataset; a tracking unit for monitoring the outbound data transfers made by a DLP agent and identifying the outgoing data transfers of different data types; a central processing unit for determining a first reputation score and destination entity for a first outbound data transfer to a specified recipient entity, determining a subsequent standing score, and determining a first violation of a DLP policy, thereby determining a second violation of the DLP policy; and a controlling unit for carrying out at least one of the reporting and/or remedial actions in response to the first, second, or both violations and generating alert for approving or denying a particular first or second outbound data transfer.

20 Claims, 5 Drawing Sheets

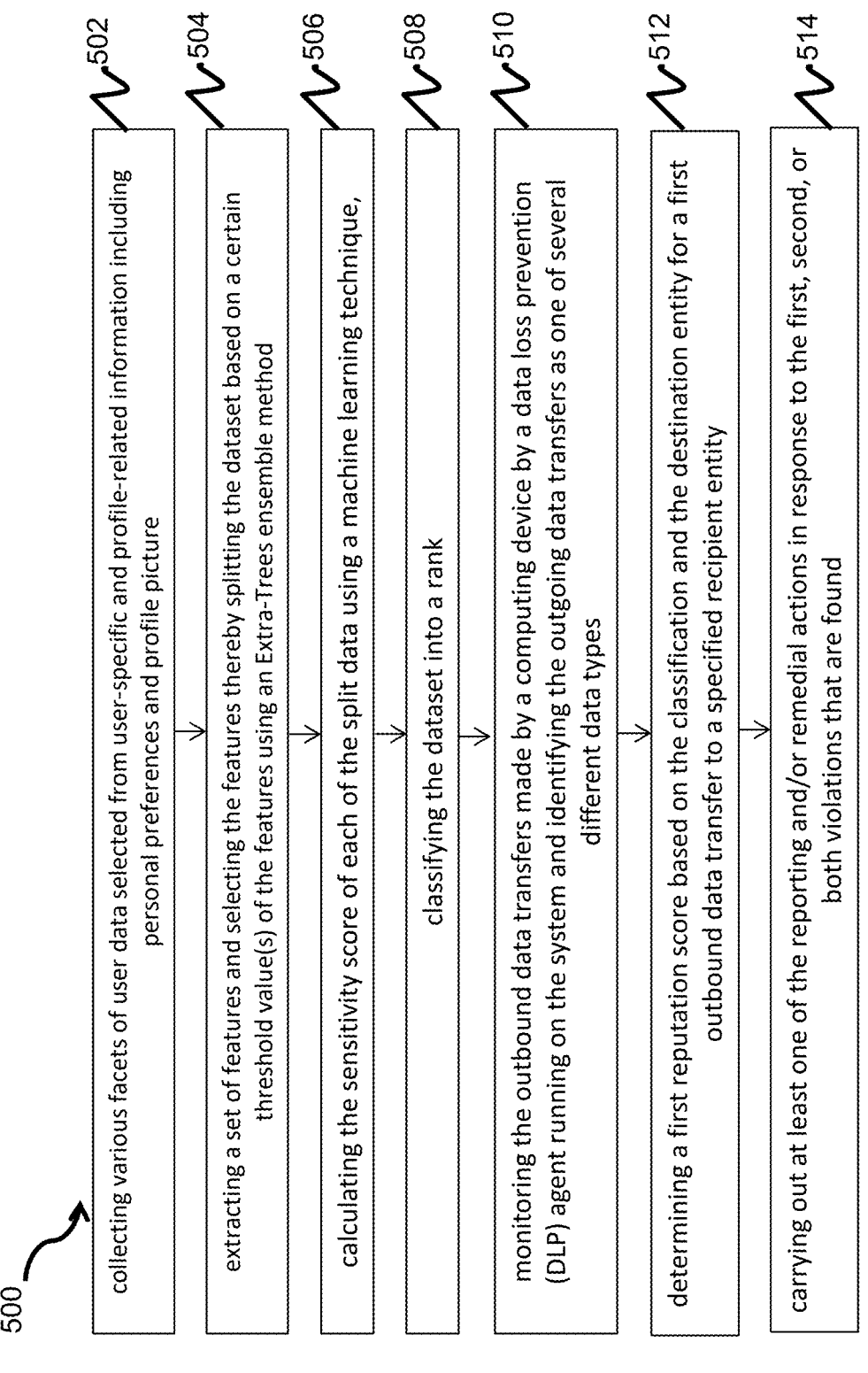

502  collecting various facets of user data selected from user-specific and profile-related information including personal preferences and profile picture 504  extracting a set of features and selecting the features thereby splitting the dataset based on a certain threshold value(s) of the features using an Extra-Trees ensemble method 506  calculating the sensitivity score of each of the split data using a machine learning technique, 508  classifying the dataset into a rank 510  monitoring the outbound data transfers made by a computing device by a data loss prevention (DLP) agent running on the system and identifying the outgoing data transfers as one of several different data types 512  determining a first reputation score based on the classification and the destination entity for a first outbound data transfer to a specified recipient entity 514  carrying out at least one of the reporting and/or remedial actions in response to the first, second, or both violations that are found

SENSITIVE INFORMATION DISCLOSURE PREDICTION SYSTEM FOR SOCIAL MEDIA USERS AND METHOD THEREOF

TECHNICAL FIELD

The present disclosure relates to systems for preventing sharing of sensitive information. More particularly, a sensitive information disclosure prediction system and method thereof for social media users using machine learning techniques and support vector machine (SVM).

BACKGROUND

Social media platforms have become an integral part of modern society, allowing users to connect, share content, and engage with others online. However, the widespread use of social media has also raised concerns about the privacy and security of personal information shared on these platforms.

Existing solutions in this domain include various privacy settings and user controls offered by social media platforms. These settings allow users to limit the visibility of their posts, control who can access their personal information, and manage the sharing of sensitive data. However, these settings often rely on the users themselves to make informed decisions about their privacy, which can be challenging and prone to errors.

Another existing approach is the use of automated techniques employed by social media platforms to detect and flag potentially sensitive content. These techniques analyze the content of user posts, comments, and messages, and employ machine learning techniques to identify potentially harmful or inappropriate content. While these systems are effective in detecting explicit content, they may not adequately address situations where sensitive information is indirectly disclosed or shared unintentionally.

Additionally, there are research studies and academic papers that focus on user behavior analysis to predict potential sensitive information disclosure on social media. These studies often utilize data mining and natural language processing techniques to analyze patterns and trends in user behavior, identifying potential indicators of sensitive information disclosure. However, these studies are limited to academic research and lack practical implementation in real-world social media platforms.

Hence, there is a need for an innovative system that can accurately predict potential instances of sensitive information disclosure on social media platforms, considering both explicit and implicit disclosure scenarios. The system should leverage advanced machine learning and data analysis techniques to assess user behavior, content patterns, and contextual information to provide proactive measures for users to protect their sensitive information effectively.

The present disclosure aims to overcome the limitations of existing solutions by providing a sensitive information disclosure prediction system that utilizes advanced techniques and contextual analysis to identify potential instances of sensitive information disclosure on social media platforms. By leveraging machine learning models and user behavior analysis, the system offers enhanced accuracy and reliability in predicting disclosure scenarios, thereby empowering users to take proactive measures to protect their privacy and prevent unintended information exposure.

BRIEF SUMMARY

The present disclosure seeks to provide a sensitive information disclosure prediction system for social media users to protect their private information from these inferences. The prediction system offers a data analytics component for accurate forecasts of users' privacy control with the help of the machine learning technique and support vector machine (SVM).

In an embodiment, a sensitive information disclosure prediction system for social media users is disclosed. The system includes a data collection unit for collecting various facets of user data selected from user-specific and profile-related information including personal preferences and profile picture, the data that generates all the information regarding interactions of SNS (social network sites) users including visit duration, information about the users' friends, activity data containing information that users shared and/or created on the website, and group data containing information about each of the group user forms and takes part in.

The process further includes a feature extraction processor for extracting a set of features and selecting the features thereby splitting the dataset based on a certain threshold value(s) of the features using an Extra-Trees ensemble method.

The process further includes a sensitivity score calculation processor for calculating the sensitivity score of each of the split data using a machine learning technique, wherein the sensitivity score is identified using the sensitive information in both SNS and the importance of information for users, wherein each feature that leads to the identification of an individual directly and/or is considered as highly sensitive will be detached and other features having less sensitivity based on the user's perspective are replaced with less semantic values to decrease the privacy risks for users.

The process includes a support vector machine (SVM) model for classifying the dataset into a rank selected from extremely sensitive, very sensitive, moderately sensitive, low sensitive, and very low sensitive using the sensitivity score of each split data.

The process further includes a tracking unit for monitoring the outbound data transfers made by a computing device by a data loss prevention (DLP) agent running on the system and identifying the outgoing data transfers as one of several different data types.

The process further includes a central processing unit for determining a first reputation score based on the classification and the destination entity for a first outbound data transfer to a specified recipient entity, where the first outbound data transfer is a first data type from the plurality of data types, and determining a subsequent standing score briefly outbound information move to the objective element determined to get the second outbound information move in light of the grouping and the objective substance, wherein the second outbound information move is a subsequent information kind of the majority of information types, and determining a first violation of a DLP policy by comparing the first reputation score to a reputation threshold, where the first violation is determined when the first reputation score is lower than the reputation threshold thereby determining a second violation of the DLP policy by comparing the second reputation score to the reputation threshold, with the second violation being identified when the second reputation score is lower than the reputation threshold.

The process further includes a controlling unit for carrying out at least one of the reporting and/or remedial actions in response to the first, second, or both violations that are found, wherein carrying out at least one of the reporting or remedial actions comprising steps of: a) generating an alert for approving or denying a particular first or second outbound data transfer; b) obtaining user input for approving or denying the particular outbound data transfer; and c) permitting the separate outbound information move when the client endorses the particular outbound information move when the user denies the respective outbound data transfer, and preventing that particular outbound data transfer.

An object of the present disclosure is to protect the private information of users from social networking sites.

Another object of the present disclosure is to prevent sharing of sensitive information.

Another object of the present disclosure is to offer a data analytics component for accurate forecasts of users' privacy control with the help of the machine learning technique.

Yet another object of the present disclosure is to deliver an expeditious and cost-effective sensitive information disclosure prediction system for social media users.

To further clarify the advantages and features of the present disclosure, a more particular description of the disclosure will be rendered by reference to specific embodiments thereof, which are illustrated in the appended drawings. It is appreciated that these drawings depict only typical embodiments of the disclosure and are therefore not to be considered limiting of its scope. The disclosure will be described and explained with additional specificity and detail in the accompanying drawings.

BRIEF DESCRIPTION OF FIGURES

These and other features, aspects, and advantages of the present disclosure will become better understood when the following detailed description is read concerning the accompanying drawings in which like characters represent like parts throughout the drawings, wherein:

FIG. 5 illustrates a sensitive information disclosure prediction method for social media users in accordance with an embodiment of the present disclosure.

Figure 1:
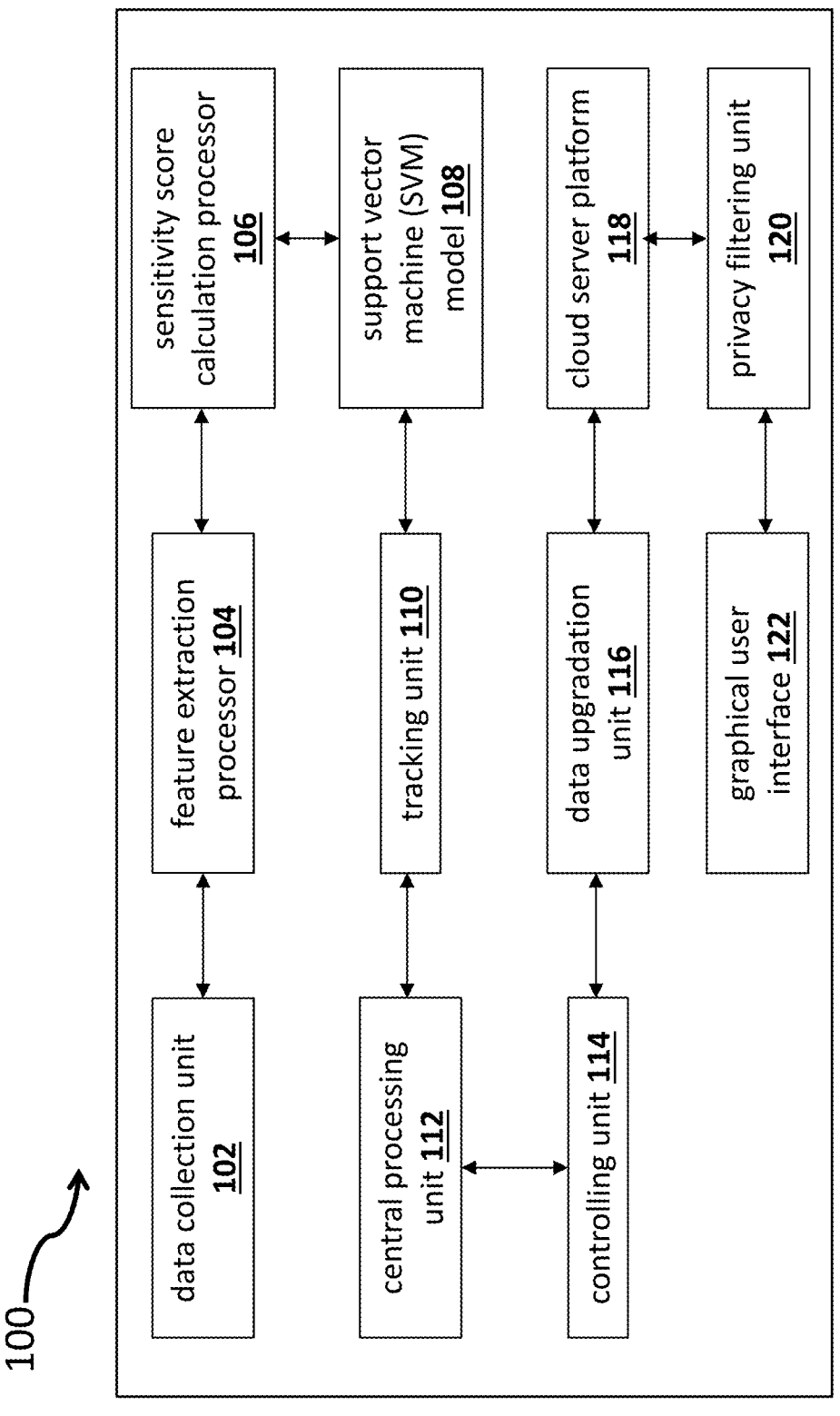
FIG. 1 illustrates a block diagram of a sensitive information disclosure prediction system for social media users in accordance with an embodiment of the present disclosure.

Further, skilled artisans will appreciate those elements in the drawings are illustrated for simplicity and may not have necessarily been drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having the benefit of the description herein.

DETAILED DESCRIPTION

To promote an understanding of the principles of the disclosure, reference will now be made to the embodiment illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are exemplary and explanatory of the disclosure and are not intended to be restrictive thereof.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this disclosure belongs. The system, methods, and examples provided herein are illustrative only and not intended to be limiting.

Embodiments of the present disclosure will be described below in detail concerning the accompanying drawings.

Referring to FIG. 1, a block diagram of a sensitive information disclosure prediction system for social media users is illustrated in accordance with an embodiment of the present disclosure. System 100 includes a data collection unit 102 for collecting various facets of user data selected from user-specific and profile-related information including personal preferences and profile picture, the data that generates all the information regarding interactions of SNS (social network sites) users including visit duration, information about the users' friends, activity data containing information that users shared and/or created on the website, and group data containing information about each of the group user forms and takes part in.

In an embodiment, a feature extraction processor 104 is coupled to the data collection unit 102 for extracting a set of features and selecting the features thereby splitting the dataset based on a certain threshold value(s) of the features using an Extra-Trees ensemble method.

In an embodiment, a sensitivity score calculation processor 106 is coupled to the feature extraction processor 104 for calculating the sensitivity score of each of the split data using a machine learning technique, wherein the sensitivity score is identified using the sensitive information in both SNS and the importance of information for users, wherein each feature that leads to the identification of an individual directly and/or is considered as highly sensitive will be detached and other features having less sensitivity based on the user's perspective are replaced with less semantic values to decrease the privacy risks for users.

In an embodiment, a support vector machine (SVM) model 108 is coupled to the sensitivity score calculation processor 106 for classifying the dataset into a rank selected from extremely sensitive, very sensitive, moderately sensitive, low sensitive, and very low sensitive using the sensitivity score of each of the split data.

In an embodiment, a tracking unit 110 is coupled to the support vector machine (SVM) model 108 for monitoring the outbound data transfers made by a computing device by a data loss prevention (DLP) agent running on the system and identifying the outgoing data transfers as one of several different data types.

In an embodiment, a central processing unit 112 is coupled to the tracking unit 110 for determining a first reputation score based on the classification and the destination entity for a first outbound data transfer to a specified recipient entity, where the first outbound data transfer is a first data type from the plurality of data types, and determining a subsequent standing score briefly outbound information move to the objective element determined to get the second outbound information move in light of the grouping and the objective substance, wherein the second outbound information move is a subsequent information kind of the majority of information types, and determining a first violation of a DLP policy by comparing the first reputation score to a reputation threshold, where the first violation is determined when the first reputation score is lower than the reputation threshold thereby determining a second violation of the DLP policy by comparing the second reputation score to the reputation threshold, with the second violation being identified when the second reputation score is lower than the reputation threshold.

In an embodiment, a controlling unit 114 is coupled to the central processing unit 112 for carrying out at least one of the reporting and/or remedial actions in response to the first, second, or both violations that are found, wherein carrying out at least one of the reporting or remedial actions comprising steps of a) generating an alert for approving or denying a particular first or second outbound data transfer, b) obtaining user input for approving or denying the particular outbound data transfer, and c) permitting the separate outbound information move when the client endorses the particular outbound information move when the user denies the respective outbound data transfer, and preventing that particular outbound data transfer.

In another embodiment, both the feature selection and the cut-off points are strongly randomized in the Extra-Trees ensemble method, wherein the feature selection is used for obtaining a feature vector to train the SVM model 108.

In another embodiment, the system further comprises a data upgradation unit 116 for updating the destination entity's first data-type reputation score for the first data type based on the first reputation score and updating the destination entity's second data-type reputation score based on the second reputation score for the second data type thereby communicating with a network community service for sharing the first data-type reputation score and the second data-type reputation score.

In another embodiment, the first and second reputation score is determined upon assigning a certain first data type and second data type to the data of a particular first outbound data transfer and second outbound data transfer and connecting the information to the final entity thereby calculating the first reputation score and second reputation score using the appropriate data type and the target entity.

In another embodiment, a cloud server platform 118 contains a set of instructions that, when executed by at least one processor, cause at least one processor to calculate the first and second reputation score upon determining whether the computing device is transmitting data to the destination entity for the first time and not during the specific outbound data transfer. Then, determine whether the controlling unit 114 is sending the desired data type to the target entity for the first time with the specific outbound data transfer. thereafter, determine whether the target entity's overall reputation score is below a certain threshold, or determine whether the destination entity's data-type reputation score for the relevant data type is within a certain level.

In another embodiment, the data from each outbound data transfer is fed into one of several different categories, with each category representing a different type of data, wherein the input is received from a client to characterize the majority of classifications, wherein the one or more data-type reputation ratings is obtained for the destination entity for the variety of data types, and at least one overall reputation score of the destination entity from a network community service.

In another embodiment, the first and second reputation score calculation requires tracking the number of DLP policy violations that are discovered through prior data transfers to the destination entity, wherein the first and second reputation score is then calculated based on the particular data type being transferred to the destination entity and the tracked number of discovered violations.

In another embodiment, the system further comprises a privacy filtering unit 120 configured to receive a user nomination for an activity type, the activity type being a classification of user-related activities for which activity data is collected. Then, allow the user to select from a predefined set of access restrictions an access restriction for accessing data entities of the activity type, wherein the access restriction defines a set of users and services that is capable of accessing data entities belonging to a respective activity type, wherein each of the data entities comprising a data record of an activity associated with the user, the access restriction configured with a filter that filters a subset of the data entities associated with the activity type. Thereafter, configure the activity monitor to grant access to data entities of the activity type based on the access limit you specify.

In another embodiment, the system further comprises a graphical user interface 122 configured to allow the user to define the activity type, wherein the graphical user interface 122 provides a user interface (UI) element configured to allow the user to select at least one activity type. Then, permit an automatic generation and formulation of a privacy profile, the privacy profile showing suggested access limits for each selected activity category. Thereafter, generate the privacy profile upon obtaining an activity record that corresponds to the data entity and evaluate the activity data to find a link thereby determining the privacy profile.

In another embodiment, the activity type is denied if the target public audience specified in the request falls outside of the access limits for the activity type, wherein the activity monitor optionally provides a request response to the requestor indicating that the request is denied, in case the request is denied by activity monitor, wherein the activity monitor does not provide the requesting party with a data entity when the request is denied that falls under the indicated activity type.

In another embodiment, generating an alert for approving or denying a particular first or second outbound data transfer using the controlling unit (114) further comprises an outbound data monitor equipped to detect initiated outbound data transfers and categorize them as either first or subsequent data movements.

In one embodiment, an alert constructor module is in communication with the outbound data monitor to instantiate an interactive notification for user interaction when an outbound data transfer is identified, the notification offering a choice to approve or deny the detected transfer.

In one embodiment, a contextual data presenter is integrated within the alert constructor module to embed relevant data details within the interactive notification, such as destination, data type, and timestamp, thereby furnishing users with information necessary for informed decision-making.

In one embodiment, a user decision receiver is configured to capture and interpret the user's decision to either approve or deny the interactive notification.

In one embodiment, a dynamic alert prioritizer is used to technically elevate the urgency of specific alerts, prioritizing them based on defined criteria like data size or destination sensitivity.

In one embodiment, a historical decision analyzer engages with stored historical user decisions, using this history to refine and potentially pre-empt the need for certain alerts for repetitive or routine transfers.

In one embodiment, a user feedback generator is activated upon receipt of a user decision, dispensing a confirmation message reflecting the user's chosen action.

In one embodiment, an alert customization interface grants system administrators the capability to delineate the parameters and triggers for alert generation, allowing adaptation to specific operational needs.

In another embodiment, the central processing unit (CPU) (112) is configured to determine the first outbound data transfer to derive the first reputation score based on the classification of the contained data, the destination entity receiving the transfer, and the specific data type of the first outbound transfer, selected from a predefined set of possible data types. Then, process a subsequent outbound data transfer to determine the second reputation score by considering the classification of the subsequent data, the intended endpoint or objective entity for this transfer, and the associated data type of this second transfer, chosen from the aforementioned set of data types. Then, compare the first and second reputation scores to a predefined reputation threshold to identify potential violations of the data loss prevention (DLP) policy, marking a violation if either reputation score is below the set threshold. Then, integrate with data source modules to fetch real-time data for analysis and dynamically update the predefined set of data types to account for emerging data categories. Then, notify system administrators through a notification module of detected DLP policy violations. Then, classify data in the transfer based on a hierarchical structure that weighs the sensitivity and importance of data categories. Then, regulate the reputation threshold based on sensitivity requirements set by the organization. Then, log records of all evaluated data transfers and detected violations using a logging module. then, map destination entities based on trust levels to influence the derivation of reputation scores. Then, present reputation scores and potential DLP policy violations and offer administrative controls for setting or adjusting thresholds via the user interface (122). Thereafter, refine and improve the accuracy of reputation score calculations over time by integrating them with machine learning techniques.

In another embodiment, approving or denying the particular outbound data transfer by the controlling unit (114) further comprises a notification generator configured to identify outbound data transfers that necessitate user approval and subsequently generate an alert using modalities including but not limited to pop-ups, system alerts, or emails.

In one embodiment, a detailed data transfer interface is configured to be activated upon user interaction with the generated notification and designed to visually represent details of the impending outbound data transfer, including the source of data, destination entity, data type, volume, or size, timestamp, and other related data transfer metrics.

In one embodiment, a user decision interface is used to present distinct user action options, primarily approve and deny selections and optionally comprising additional selection criteria like remembering this choice for similar transfers or the capacity to recognize and add a destination to a list of trusted entities.

In one embodiment, a decision processor is configured to be tasked with receiving and interpreting the user's chosen action and engineered to either authorize or prohibit the outbound data transfer based on the user's selection.

In one embodiment, a decision logger is integrated to systematically document and store every user decision, and built with the capability to use stored decisions for audit trails, user preference learning, or reference purposes.

In one embodiment, a feedback mechanism is configured to be activated post-decision to furnish the user with a confirmation message corresponding to their action, providing statuses like transfer in progress or transfer stopped.

In one embodiment, an exception handler is used to default to pre-set behaviors if a user remains indecisive within a designated timeframe and is equipped with the capability to provide informative responses for any discrepancies, errors, or uncommon behaviors observed during the user decision-making sequence.

In one embodiment, an adaptive learning module is used to understand and adapt to user behaviors over time, optimizing system responses based on prior logged decisions.

In another embodiment, permitting the separate outbound information move using the controlling unit (114) further comprises an outbound data identification unit configured to detect and catalog separate outbound data movements initiated from within the system.

In one embodiment, a user interaction interface is used to capture user decisions related to the identified outbound data transfers and present a clear visual prompt to the user, soliciting an endorsement or denial of the particular outbound data movement.

In one embodiment, a data transfer authorization processor is interlinked with the user interaction interface and tasked with analyzing the user's decision, wherein in instances where the user endorses a particular outbound data transfer, the processor is configured to authorize the progression of that respective data movement, and conversely, upon user denial, the processor instantaneously halts or prevents that specific outbound data transfer.

In one embodiment, a decision logger unit is integrated to systematically capture, record, and store each user's decision concerning outbound data transfers, thereby being built to offer insights and provide a traceable record for both endorsed and denied data transfer requests.

In one embodiment, an error handling unit is used to address potential discrepancies or system errors arising during the user decision-making sequence and provides feedback to the user or system administrator concerning any issues preventing the execution of the user's decision, ensuring a seamless user experience.

In one embodiment, a data transfer tracker continuously monitors and logs the status of outbound data transfers, and ensures that only user-endorsed transfers proceed while denied transfers remain halted or terminated.

In one embodiment, a feedback mechanism is deployed post-decision-making process, and provides the user with a timely confirmation message that mirrors their decision, delivering real-time statuses like transfer approved or transfer denied.

Figure 2:
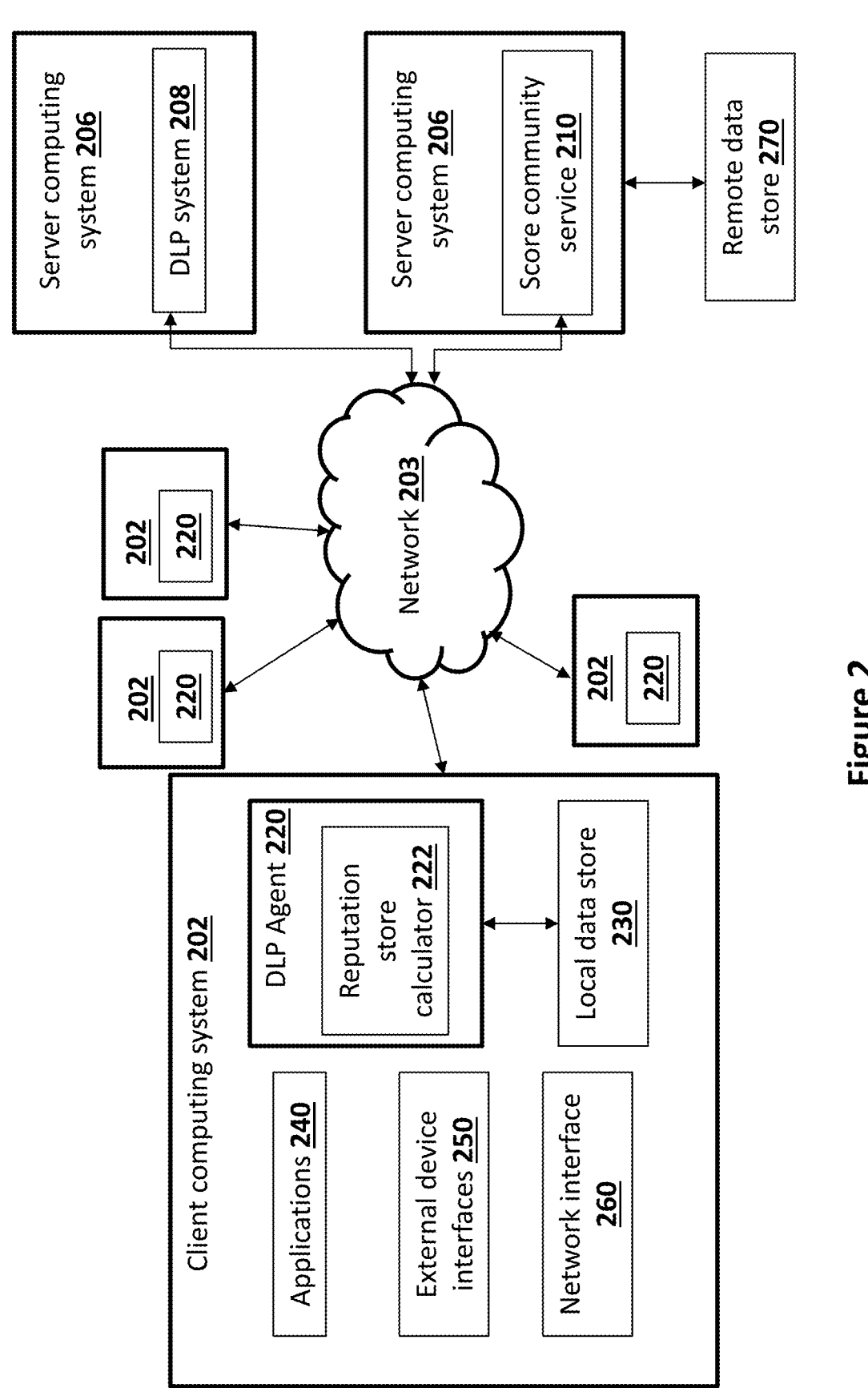
FIG. 2 illustrates a schematic diagram for preventing inappropriate data transfers based on reputation scores in accordance with an embodiment of the present disclosure.

FIG. 2 illustrates a schematic diagram for preventing inappropriate data transfers based on reputation scores in accordance with an embodiment of the present disclosure. The DLP agent hosted by the computing system monitors the computing system's outbound data flows. The DLP agent assigns a reputation score to each of the data transfers to the specified destination entities. The reputation scores are determined by the DLP agent based on the data type of the data being transmitted to the corresponding destination organization. Based on the reputation score, the DLP agent detects a violation of the DLP rules. The DLP agent may notify a DLP system, a system administrator, or someone else about the infraction. In reaction to identifying the violation, the DLP agent may also take corrective action.

In one embodiment, the computing system, such as a computer, a mobile phone, an application running on a computing system, a set of Internet Protocol (IP) addresses, a website, a Universal Serial Bus (USB) device, a disc device, an email address, an instant messenger service, a social network account, or the like, could be the destination entity. In one embodiment, the DLP agent contains a classification engine that is used to categorize data into various categories established by the user, an administrator, or another automated process, such as an application. Financial, Corporate, Health, Friends, Music, E-Mails, and the like are some examples of suitable categories for a smartphone. The categorization engine processes all outgoing data transfers from the computing system. As a result, each item of incoming data is connected with a data category and a destination entity. The DLP agent also features a reputation score calculator, which calculates a reputation score for each data transfer, destination, data type, destination entity, or any combination of these. The DLP agent also has a detection system that uses reputation scores to assess if a data transfer is safe or hazardous (unsecured) depending on a variety of parameters. If the data transfer is deemed hazardous or insecure, the DLP agent recognizes it as a violation of a DLP policy and can take appropriate corrective or reporting steps, as explained below. In other implementations, every time a transmitting entity allows or refuses a data transmission, this decision may be used as a parameter in the reputation score computation for both the remote and transmitting entities.

As previously stated, present security solutions do not provide a way for the destination entities receiving the data to categorize the type of data. The embodiments presented herein provide an improved DLP system that permits data categorization into several categories as well as the calculation of reputation ratings for the destination entity in those different categories. These implementations can be utilized to simply monitor outbound data transfers to various destination entities and detect DLP policy violations based on those destination entities' reputation scores.

Numerous details are included in the following description. However, one ordinary skill in the field with the benefit of this disclosure will recognize that implementations of the present disclosure may be practiced without these specific specifics.

The network architecture may contain numerous client computer systems 202 and multiple server computing systems 206 connected via a network 203 (e.g., a public network such as the Internet or a private network such as a local area network (LAN)). Personal computers, laptops, PDAs, mobile phones, network appliances, and other devices may be part of the client computing system 202. The server computing system 206 could be a network appliance, a gateway, a personal computer, or something else. Client computing systems 202 and server computing systems 206 may be on the same LAN or on distinct LANs that are connected via the Internet but separated by firewalls, routers, and/or other network devices. One of the server computing systems 206 may host a DLP system 208, and another one of the server computing systems 206 may host a reputation score of community service 210. Alternatively, a single computing system 206 may host the DLP system 208 and the reputation score community service 210. In one embodiment, the server computing systems 206 and the reputation score community service 210 may be part of an organization, such as a corporate enterprise. Alternatively, the server computing system 206 and the reputation score community service 210 may be part of different organizations.

DLP agents 220 can communicate with the DLP system 208. The embodiments can be utilized in a DLP system using DLP agents 220, but they can also be employed in other DLP products. Furthermore, the embodiments disclosed herein may be employed in various applications for detecting policy violations based on reputation scores, as one of ordinary skill in the art would realize having the benefit of this disclosure.

The DLP agents 220 include a reputation score calculator 224, which is set up to calculate reputation scores for monitored outbound data transfers from the client computing system 202 (e.g., transmitting entity) to destination entities to detect DLP policy violations based on reputation scores. The DLP system 208 may communicate with DLP agents 220 on the client computer systems 202 to perform the operations defined herein to enforce a DLP policy. The DLP agent 220 is set up to detect DLP policy violations based on the reputation stores of data transfers. When a violation is discovered, the DLP agent 220 creates an incident record and, for example, sends the incident record to the DLP system 208. The DLP system 208 is set up to receive the violation incident record from the DLP agent 220. The incident records are created by the DLP agent 220 in these implementations. In other implementations, however, any DLP product may be used to identify a violation and create an incident, and it is not restricted to employing DLP agents on an endpoint as described herein. It should also be noted that systems other than DLP systems can utilize the reputation score calculator 222 to determine the reputation scores of different sorts of data transfers to different entities.

In one embodiment, the reputation score community service 210 is used as an online community to rate destination entities, such as by keeping reputation scores for various destination entities and data kinds for these destination entities. The reputation score Community Service 210, for example, may keep a database with several entries, each holding reputation information on the target entity.

In one embodiment, the reputation score community service 210 saves reputation score data in the remote data store 270, which is linked to the server computer system 206. In another aspect, the remote data storage 270 is close to the server computing system 206 but far from the client computer system 202.

In another embodiment, the DLP system 208 may be combined with the reputation score community service 210. The DLP system 208 in this embodiment may be configured to deliver reputation scores to the DLP agents. Multiple users in the community can be used by the reputation score community service 210 to determine the overall reputation scores of the destination entities and/or data-type reputation scores for given data types for those destination entities. The DLP agents 220 can be set to report reputation scores to the reputation score community service 210 either immediately or regularly. Alternatively, when determining the reputation score for a certain data transfer, the DLP agent 220 can request the reputation scores from the reputation score community service 210. The community service 210 reputation score might be private or public. For example, the reputation score community service 210 may be operated by the same organization that manages the DLP system 208, and the reputation ratings are tailored to the organization's DLP policies. Alternatively, the reputation score community service 210 could be a public service to which subscribers can submit reputation score information and get reputation scores. The reputation score of community service 210 can be applied in additional ways that a person of ordinary skill in the art would recognize if they had the benefit of this disclosure. It should also be noted that the reputation scores provided by the reputation score community service 210 can be used in place of the reputation scores computed by the reputation score calculator 222, or as a parameter input to the reputation score calculator 222 when calculating the reputation scores.

Even though there are only two server computing systems 206, the DLP system 208 and/or reputation score community service 210 may be hosted on one or more machines, such as server computers, client computers, gateways, or other computing devices. In another option, the DLP service may be located on a single server or on multiple servers that are linked to other devices via a public network (e.g., the Internet) or a private network (e.g., LAN).

In one embodiment, the reputation score community service 210 and the DLP system 208 are components of the entity system of an organization. In another example, the reputation score community service 210 and the DLP system 208 are hosted by a service provider. In addition, the hosted service provider may have numerous instances of the reputation score community service 210 and the DLP system 208 on multiple networks that connect with the service provider via a public or private network.

In another embodiment, the reputation score community service 210 and the DLP system 208 are hosted by two independent service providers. It should be noted that different network configurations, such as hosted configurations, dispersed configurations, centralized configurations, and so on, can be employed.

The shown client computing system 202 includes a DLP agent 220 that connects with the DLP system 208 and may operate as an endpoint machine in a corporate network that employs the reputation score community service 210 and/or the DLP system 208 to enforce one or more DLP policies. As one of the ordinary skills in the art would realize having the benefit of this disclosure, the client computer system 202 may comprise applications 240, external device interfaces 250, and network interfaces 260 that can be monitored by the DLP agent 202. A local data store 230, which can be one or more centralized data repositories that hold reputation score information, violation information, DLP policy information, and the like, may also be included in the client computing system 202. The local data store 230 can represent a single or many data structures (databases, repositories, files, and so on) that are stored on one or more mass storage devices, such as magnetic or optical storage-based discs, tapes, or hard drives. Although shown as being local to the client computing system 202, the local data store 230 may be remote from the client computing system 202 and communicate with the client computing system 202 via a public or private network.

DLP agent 220, which includes a classification engine, a reputation score calculator 222, and a detection system for detecting DLP policy breaches based on reputation scores. A violation reporter, a policy manager, and a policy data store are also included in the DLP agent 220. The classification engine in the described embodiment is set up to monitor outbound data transfers. Outbound data transfers may include data in transit, such example data associated with outgoing messages or other network traffic delivered to a destination entity by the client computing system 202. Data may also be printed or transferred to a remote storage device, such as a USB drive, a remote disc, or the like, as part of the outbound data transfers. Outbound data transfers can be any data transported by the client computing system 202 over a wireless or wired connection to a destination entity, such as another device, or to a distant device, such as a detachable storage drive, for example. Outbound data transfers can take place across network 203 or directly to the client computing system 202.

The classification engine is set up to categorize the data from the outbound data transfers into one of several categories, each representing a different data type.

In one embodiment, the classification engine is a general field classification engine that categorizes data as Financial, Corporate, Health, Friends, Music, Videos, Banking, E-Mails, Personal Identifying Information, Confidential, and the like.

In another embodiment, the characterization motor is a programmed grouping motor (Pro), which incorporates various predefined arrangements, as well as the capacity to adjust the predefined characterizations or add or eliminate client-characterized orders. The following are examples of predetermined categories: 1) Client-Attorney Privilege: Labels; 2) Legal right to confidentiality: Secondary Benefits; 3) Documents of Law (attachments); 4) Hostile to Illegal tax avoidance—Monetary Exchanges and Office of Unfamiliar Resources Control (OFAC) Rundown; 5) Client Objections—Legitimate; 6) Complaints from Customers—Service and Support; 7) Responses to Customer Complaints; 8) Messages Auto-Generated—Read: Not Printed: Auto-Reply from Out of Office, etc. 9) Auto Created News, Exploration, and Showcasing Channels—(pamphlets, research, shopping advertising); 10) Faxes and attachments; 11) PSTs and NSFs as attachments; 12) PowerPoint attachments; 13) Published data (such as marketing research); 14) Data fraud; 15) Numbers for Social Security; 16) Actually Recognizable Data; 17) Account Identifiers; 18) English as a language; 19) Other than English; 20) Language-French; 21) Spanish as a language; 22) The German language; 23) Chinese language (character set); 24) Japanese (character set) is the language. 25) Korean language (character set); 26) Connections—Video Records; 27) Audio Files as Attachments; 28) Attachments: Files for audio and video; 29) Connections—Realistic Documents; 30) Labeled for Internal Use; 31) A Draft of the Document (attached); 32) Harmful Language: Seven Deadly Words; 33) Hostile Language—Broadened Level 1; 34) Harassment in general; 35) Harassment of the sex; 36) Hate speech; 37) One's faith; 38) Jokes; 39) Mail by chain; 40) Discussions about compensation; 41) Political solicitations; 42) Charitable solicitations; 43) Requesting—Confidential Venture; 44) Gambling; 45) The Gaming 46) Lists of Contact Information; 47) Headshots; 48) Financial Attachments—Income Statements and Balance Sheets for the Business; 49) Financial Attachments, such as Purchase Orders, Bills, and Invoices; 50) Business Financial Information Communication Obviously, the order motor might be designed to screen and characterize a subset of the classifications recorded above for reasons for deciding notorieties scores and identifying infringement of the DLP strategy in light of the notorieties scores. A person of ordinary skill in the art who has the benefit of this disclosure would know, other categories can, of course, be used. The classes (i.e., characterizations) might be predefined and might be programmable by the client of the processing framework 202 or a chairman of an element or association dealing with the framework.

In another embodiment, the classification engine categorizes the data transfers based on one or more of the following criteria: the file extension type of the data when contained in a file, the content of the data itself, the type of data (e.g., 16-digit numbers for credit cards, 9-digit numbers for social security numbers), the placement of the data in a file, or the like. Alternatively, the classification engine can utilize additional approaches to divide the data into several categories so that the reputation score calculator 222 can rank individually for distinct destination entities.

Once the data of the outbound data transfer has been classified, the classification engine associates the data with one of the categories (e.g., Health, Financial, Corporate, or other data types) and associates the data with the destination entity specified to receive the respective outbound data transfer. The classification engine delivers this information to the reputation score calculator 222, which computes the data transfer's reputation score.

In one embodiment, based on the data type of the data being transferred to the destination entity, the reputation score calculator 222 calculates a reputation score for the outbound data transfer to a destination entity (e.g., a website) chosen to accept the data transfer. The reputation score calculator 222 may compute the reputation score differently, but the reputation scores can be used by the detection system to enforce DLP policies. For example, an application server that runs a web application may have a high reputation score for data types that are considered to be beneficial for the operation of the web application (e.g., a music application would be expected to receive data with a data type classed as music or media). The same application server that hosts the web application may receive a lower reputation score for data categories that are not expected to be helpful for the operation of the website (for example, a music application is not expected to receive social security information). The classification engine and the reputation score calculator 222 allow data transfers to be evaluated based on classification and destination to improve monitoring and detection of policy violations by data transfers.

Once the reputation score is computed, it is sent to the detection system to assess whether the data transfer violates a DLP policy. The detection system detects DLP policies and may undertake some remedial or notification operations to assist in the enforcement of DLP policies.

In one embodiment, when one of the following occurs, the detection system is set up to label the data transfer as risky or as in violation of the DLP policy: 1) If this is the first time the given transmitting entity (the user's computing system) sends data to the destination entity; 2) Assuming this is the first time that information of the given class is being sent by the given communicating element to the objective substance; 3) If the destination entity's overall reputation score falls below a predetermined reputation threshold; 4) If the destination entity's reputation score for the selected category falls below a predetermined reputation threshold (referred to as a "data-type reputation score" in this document).

In one embodiment, the reputation score calculator 222 computes the reputation score for the given data transfer, but it also keeps track of other reputation score data, such as an overall reputation score for the given entity, a data-type reputation score for each of the different data types for the given destination entity, and so on.

In some embodiments, when the detection system deems a data transfer to be insecure (e.g., detects a breach of the DLP policy), it can interrupt the transfer and notify a user or administrator. The detection system, for example, can create a warning for a user to accept or refuse the data transmission. Similarly, the alert can be sent to an administrator, who can then accept or reject the data transmission. The warning may include information about the destination entity's total reputation score as well as the reputation score for a specific category of data for that destination entity. For example, if a music application transmits the user's song preferences or playlist to a reputable radio station server, the reputation score calculator 222 may rank the destination entity as having a good overall reputation score, as well as a good reputation score for the music category, but may rank the destination entity as having a poor reputation score for credit card data or other types of data.

In one embodiment, when the detection system detects a violation, the violation reporter makes an incident record of the violation and transmits it to the DLP system 208, as well as storing it in the local data store 230. The violation reporter can provide incident records as they are generated or regularly. Similarly, the violation reporter can send multiple incident records in batches or sequentially to the DLP system 208. If a violation is detected, the violation reporter may tell a system administrator about the policy violation incident (e.g., send an email or update a log file) and may communicate information about the policy violation incident to the DLP service provider. The information sent to the DLP service provider may identify, for example, the DLP policy is violated, the type of data being transferred, the destination entity specified to receive the data transfer, a reputation score of the data transfer, an overall reputation score of the destination entity, or other information concerning the violation, an identifier of the user or client computing system 202 that caused the violation, and other information that may be sent to the DLP service provider.

Figure 3:
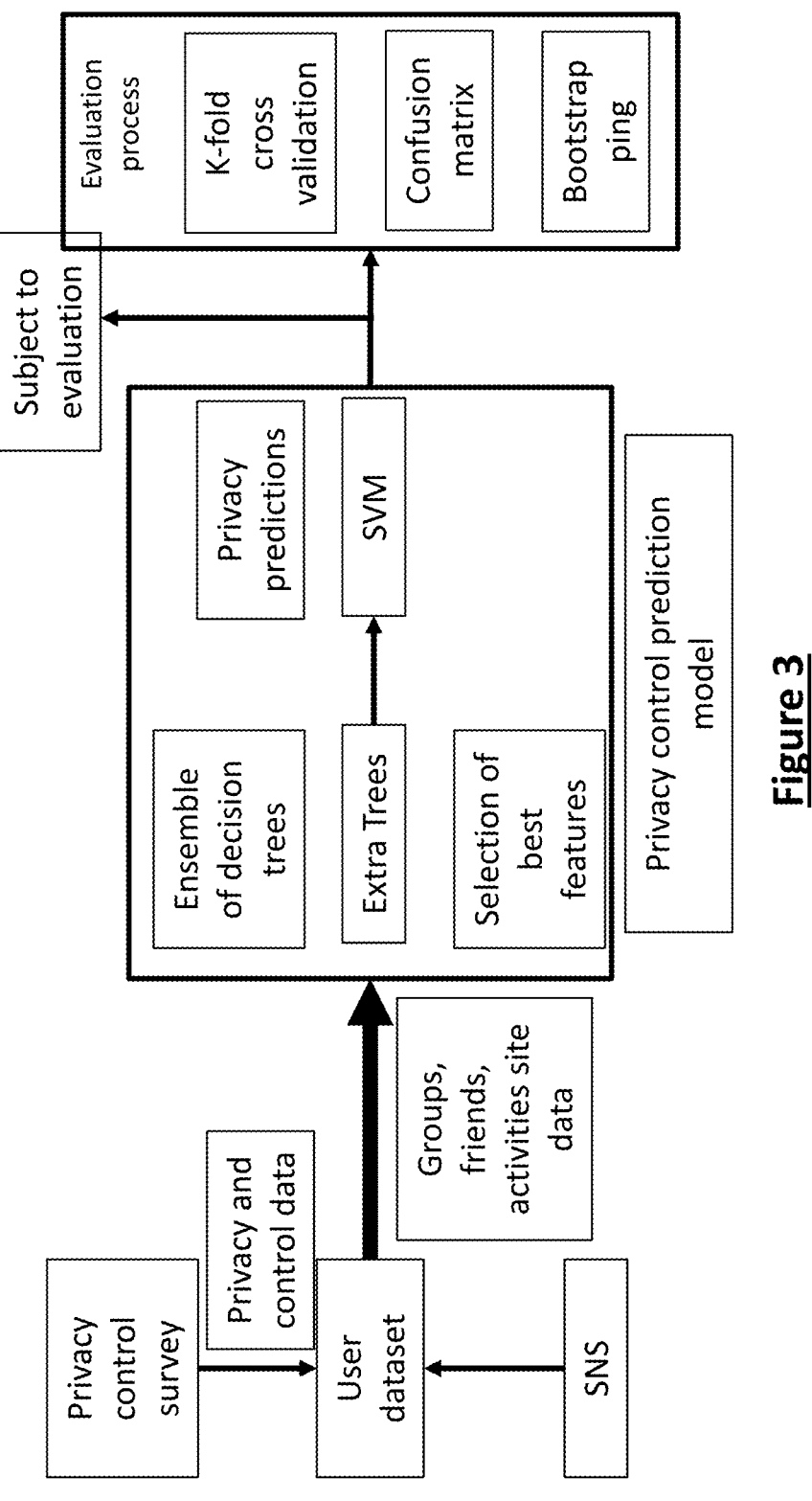
FIG. 3 illustrates a schematic diagram for privacy control prediction in accordance with an embodiment of the present disclosure.

FIG. 3 illustrates a schematic diagram for privacy control prediction in accordance with an embodiment of the present disclosure. The prediction model is used to assess the SNS users' privacy control. The prediction model's purpose is to anticipate users' privacy control reliably and automatically in comparison to subjective assessment (through a survey). In other words, it should be able to imitate the perception of private control held by consumers.

First, the finest features are taken from the Extra-Trees feature set and extracted from them. The Support Vector Machine, also known as the SVM model 108 is then used for classification.

Selection of Best Features-Decision Trees (Extra-Trees)

Most data sources throughout the world generate raw data with some level of redundancy. It is critical to extract non-redundant features throughout the prediction phase to increase model predictability and generalizability. As a result, dimension reduction has become an important subfield in machine learning. Reducing the number of dimensions (or features) in a dataset enables for the selection of features to be used in the final prediction model. The Extra-Trees ensemble method is used to choose the best-performing features from the dataset to extract non-redundant features from the feature set and increase model predictability and generalizability.

The Extra-Trees approach, which is a randomized ensemble of decision trees, is computationally efficient in minimizing the final model's redundancy. ET predicts in two steps: choosing the features and separating the dataset based on a specific threshold value(s) of the features. Both of these stages are intended to bring each data point closer to its real class. As a result, the ET technique enhances the process and forecast accuracy in general by aggregating (e.g., average) over a large number of decision trees. The ET approach added a randomization aspect to the machine learning technique, resulting in these decision trees. A random subset of the data is frequently chosen to create candidate decision tree models.

In the ET technique, both the component decision and the limits are firmly randomized. Additionally, the method does not bootstrap from the initial sample; instead, it develops each decision tree by utilizing the entire learning sample. For a larger portion of the sample, the prediction decision is influenced by the features at the top of the tree. As a result, in a decision tree, these features are more "important" than features closer to (and including) the leaf nodes. The expected proportion of learning samples whose prediction is a contribution of the in-question feature is used to measure this relative importance.

A criterion function is a way to measure a split's quality when Extra-Trees are used. Two supported criteria exist: "gini" refers to the Gini impurity, and "entropy" refers to the gain of information.

Support Vector Machines (SVM)

The definition of a model with parameters that are optimized with training data—also known as a learning process—is the first step in the machine learning process. AI calculations are progressively embraced in foreseeing client ways of behaving. One of the many uses of machine learning is classification, which entails classifying a new observation in the presence of training data (supervised learning). Support vector machine (SVM) is quite possibly the strongest technique during the time spent administering learning. IS research has utilized the widely used prediction technique known as SVM.

Prediction with SVM has been used in numerous fields, particularly computer security. SVM is one of the most steady and all-around read-up AI calculations for parallel expectations. Prominent researchers have named SVM one of the top ten classification techniques. SVM is powerful in conveyance of the information and is precise with the small size of preparing information. SVM can be used with a variety of data types and provides quick training results. The SVM is selected as the prediction model for these reasons.

The SVM model 108 is deployed and runs through its implementation using the best features from the ET approach. SVM uses the concept of hyperplanes to divide data into two or more classes. In general, a hyperplane is a set that may be characterized by any scalar product equality. It depicts all the points in a plane in N−1 dimensional space in the context of data with N dimensions. Based on training data, SVM seeks the maximum-margin hyperplanes to divide an observation into predefined classes.

It is possible to draw a hyperplane between two support vectors in a high-dimensional feature space using kernel functions in SVM. The basis of these kernel functions can be radial, linear, or polynomial (RB). Finding parameters that perform well is essential to any classification model. The SVM model 108 is prepared to assess the best boundaries. Over a variety of classifier parameter values, the best model is estimated. Gamma is estimated to be 1E-6, and the best value for the regularization parameter C is found to be 1000. C decides how smooth or harsh the choice surface is. The influence of a single training data point is reduced by gamma.

Figure 4:
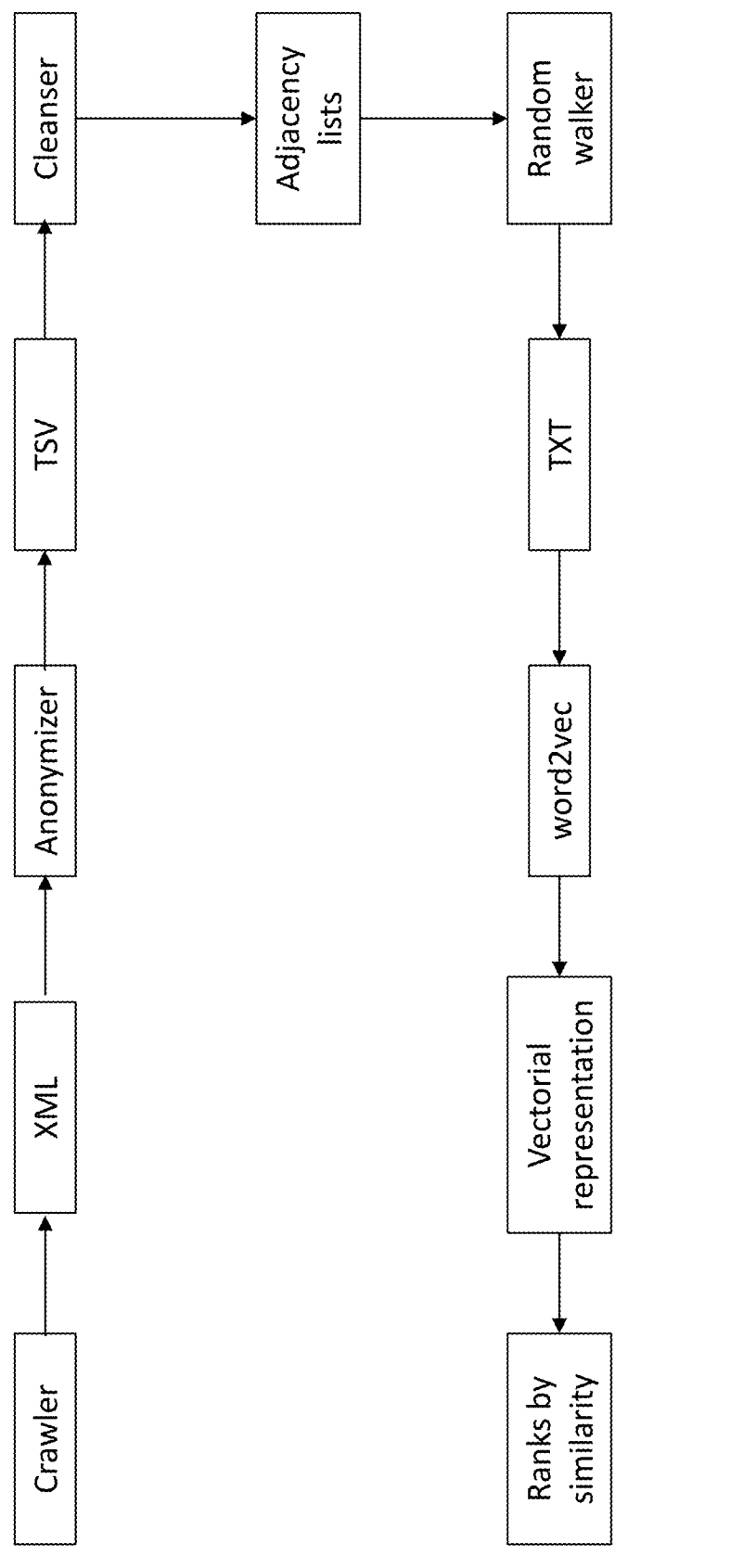
FIG. 4 illustrates an architecture for sensitive attribute prediction for social network users in accordance with an embodiment of the present disclosure.

FIG. 4 illustrates an architecture for sensitive attribute prediction for social network users in accordance with an embodiment of the present disclosure. The crawler (around 5 k lines of Java 8) drives a Firefox 58.0b4 pilot through a Selenium 3.5.3 server 1. Separate XML files hold the information gathered from each profile, group, and page. The Anonymizer, Chemical, Arbitrary walker and Ranker parts are written in Python 2.7 (around 2.5 k lines of code). The Anonymizer component generates anonymized graphs, parses all XML files, and saves them as TSV files. The Cleanser then stores the most important graphs as adjacency lists. The Random walker component looks through the adjacency lists and saves the walks it finds in a text file. The Python gensim 2 execution is used by Word2Vec to parse the message record and register a vectorial portrayal of informal community hubs experienced in the walk. The sensor nodes are then categorized by the Ranker component based on how similar they are to the target user profile.

The crawler is developed that gathers public information from visited web pages (such as friends, liked pages, etc.) while exploring the social network in the user's immediate vicinity (to a distance specified as a parameter). to construct a subnetwork that is representative. There are two distinct categories of Facebook nodes: pages (u) and user profiles (p), as well as two kinds of links: like-ships between client profiles and pages, and fellowships between client profiles. The set of nodes that are linked to a given node, c.n, is referred to as a discovered node when the crawler knows the URL of the node. For instance, if the crawler finds a user's profile and gathers its public friend list, all of that user's friends will be found. Calculation 1 slithers all things considered nc hubs at a distance≤d from the objective hub ut. Every emphasis of the external circle tests a hub, slithers it, and updates the arrangements of found and crept hubs. Random walks of length d with a transition probability designed to crawl with closer nodes of higher priority and to favor neighbor nodes based on their type are used for the sampling. Capability sinks (j) return the arrangement of sinks, for example, crept hubs to such an extent that all found hubs at distance≤j are additionally slithered. The random walks avoid sinks to ensure that the final node has not yet been crawled.

Social Network Model demonstrating friendships. An undirected graph (U, F), in which U represents a collection of user profiles and F represents a collection of friendship links between them, is used to model Facebook friendship because it is symmetric.

Like-ship modeling on the page. The model like-transport between client profiles and pages by a few bipartite charts (U, P,) where U is a bunch of clients profiles, P is a bunch of pages (a sort) and L is a bunch of like-transport joins between them. Models in graph (a) and (b) preferred music-related pages, respectively. It is known that user profiles can be multiple pages of the same type.

Anonymizing the informal community diagrams. Facebook identifiers are being replaced by new identifiers for ethical and regulatory reasons. Then, instead of its Facebook ID, a unique integer ID is used to identify each node in the network. The node types are used to sort the anonymized IDs. The tab-separated value (TSV) format, which is one of the most common delimiter-separated values formats (DSV), is used to save anonymized graphs. In graph exchange, TSV is frequently used. All attribute values are anonymized in our datasets, in contrast to Netflix 4's dataset, which only anonymizes user IDs (but not movie titles, ratings, or dates of rating).

In the following, a sensitive graph models an attribute that the user considers to be sensitive (i.e., the user does not want its value to be predictable). To predict hidden links in the sensitive graph, the learning module has access to the learning graphs, which are attribute graphs.

Model Cleansing

The size of the datasets makes it difficult to distinguish a sensitive attribute from the others. Thusly, the deduction cycle is applied just to a subset of the most significant qualities for the errand. Since it has been observed that i) a user who hides a sensitive attribute is likely to hide other semantically related attributes, and ii) the attributes' semantics are difficult to recover for fully anonymized datasets, our relevance concept does not rely on semantic proximity. Instead, the attributes graph structures have been compared.

Stage 1: Calculating learning graphs' confidence and learning rates to look at the design of a given learning diagram to the construction of the delicate chart, by initially splitting each diagram in quite a while. User profiles that conceal their links in the sensitive graph make up the first section. The proportion of client profiles that distribute their connections in the initial segment of the learning diagram addresses the learning rate lr. The subsequent part contains client profiles that distribute their connections in the delicate chart. The confidence rate (cr) is the proportion of user profiles that publish their links in the second section of the learning graph.

The sensitive graph is the graph that represents the relationship between politician pages and user profiles. Also, the diagram that models the connection transport between client profiles and pages of music is the learning chart. In this case, the learning rate (lr) is equal to 50%. Additionally, the confidence rate (cr) equals 75%.

Step 2: Calculate the distance that separates the sensitive graph from the learning graph. User profiles with a null degree in either the learning or sensitive graphs are discarded in this step.

Step 3: Choose the most relevant graphs for learning the values of sensitive attributes. The learning diagrams that have a learning rate lr lower than the limit $\theta$lr are first disposed of since they don't pass on sufficient data. The graphs with a confidence rate cr lower than cr are then discarded because they are deemed unreliable. Last but not least, since they are the most comparable to the sensitive graph, only those graphs are selected from the remaining ones with a Hamming rate hr greater than hr.

Densifying Graphs

User profiles can only be linked to one value for sensitive attributes like age, gender, and relationship status. Additionally, the number of sets of values for these particular attributes is significantly smaller than for other attributes. As a result, the graphs that represent these characteristics are denser than the others. In this instance, several learning graphs need to combine to create a denser one to enhance the random-walk-based learning process. The procedure has been illustrated with a straightforward example of gender prediction: select characteristic diagrams with high lr, cr rates yet with likewise a decent pace of separation between sexual orientations, that is the orientation of associated clients in the chart is lopsided among male and female. For example, choose gems and cheap food diagrams. To create a new learning graph, combine these graphs by putting all fast food in a single node.

FIG. 5 illustrates a sensitive information disclosure prediction method for social media users in accordance with an embodiment of the present disclosure. At step 502, method 500 includes collecting various facets of user data selected from user-specific and profile-related information including personal preferences and profile picture, wherein the data that generates all the information regarding interactions of SNS (social network sites) users including visit duration, information about the users' friends, activity data containing information that users shared and/or created on the website, and group data containing information about each of the group user forms and takes part in.

At step 504, method 500 includes extracting a set of features and selecting the features thereby splitting the dataset based on a certain threshold value(s) of the features using an Extra-Trees ensemble method.

At step 506, method 500 includes calculating the sensitivity score of each of the split data using a machine learning technique, wherein the sensitivity score is identified using the sensitive information in both SNS and the importance of information for users, wherein each feature that leads to the identification of an individual directly and/or is considered as highly sensitive will be detached and other features having less sensitivity based on the user's perspective are replaced with less semantic values to decrease the privacy risks for users.

At step 508, method 500 includes classifying the dataset into a rank selected from extremely sensitive, very sensitive, moderately sensitive, low sensitivity, and very low sensitive using the sensitivity score of each of the split data.

At step 510, method 500 includes monitoring the outbound data transfers made by a computing device by a data loss prevention (DLP) agent running on the system and identifying the outgoing data transfers as one of several different data types.

At step 512, method 500 includes determining a first reputation score based on the classification and the destination entity for a first outbound data transfer to a specified recipient entity, where the first outbound data transfer is a first data type from the plurality of data types, and determining a subsequent standing score briefly outbound information move to the objective element determined to get the second outbound information move in light of the grouping and the objective substance, wherein the second outbound information move is a subsequent information kind of the majority of information types, and determining a first violation of a DLP policy by comparing the first reputation score to a reputation threshold, where the first violation is determined when the first reputation score is lower than the reputation threshold thereby determining a second violation of the DLP policy by comparing the second reputation score to the reputation threshold, with the second violation being identified when the second reputation score is lower than the reputation threshold.

At step 514, method 500 includes carrying out at least one of the reporting and/or remedial actions in response to the first, second, or both violations that are found, wherein carrying out at least one of the reporting or remedial actions comprising steps of generating an alert for approving or denying a particular first or second outbound data transfer, obtaining user input for approving or denying the particular outbound data transfer, and permitting the separate outbound information move when the client endorses the particular outbound information move when the user denies the respective outbound data transfer, and preventing that particular outbound data transfer.

In another embodiment, accessing a user's profile on a social network site (SNS) and initiating data collection by fetching profile metadata, including user-defined preferences. Then, capturing graphical data, specifically analyzing and extracting feature vectors from the profile picture. Then, logging user activity metrics, notably visit duration. Then, crawling and indexing users' friends' profiles to obtain relational data. Then, capturing posts, comments, likes, and shares generates a user interaction dataset. Thereafter, iterating through user's group associations, detailing the groups joined content shared within them and engagement metrics.

In another embodiment, enhancing data utility and privacy by implementing the Extra-Trees ensemble method for high-dimensional data to break down user datasets. Then, analyzing the constructed feature space to determine and extract the most salient feature vectors. Thereafter, dividing the dataset based on computed threshold values of significant features.

In another embodiment, elevating privacy measures by assigning a sensitivity score to data fragments leveraging advanced machine learning techniques, emphasizing differential privacy techniques. Then, balancing between raw sensitive data from the SNS and the weighted importance assigned by the user to their data. Then, isolating features capable of direct user identification or tagged as highly sensitive. Thereafter, utilizing semantic transformation techniques to modify less sensitive features, ensuring data integrity and reduced privacy concerns.

In another embodiment, utilizing advanced machine learning classifiers, notably engaging an optimized Support Vector Machine (SVM) model for multi-category classification. Then, assigning sensitivity labels ranging from "extremely sensitive" to "very low sensitive" based on the aforementioned sensitivity scores.

In another embodiment, monitoring data transfers in real-time by invoking a data loss prevention (DLP) agent that operates in tandem with the OS to scrutinize outbound data packets. Then, employing deep packet inspection to categorize the data being transferred as per a predefined set of data type categories.

In another embodiment, strategizing data transfer safety by computing reputation scores using advanced neural network models that consider both the data classification and the intended destination entity. Then, analyzing historical data transfers, considering both the frequency and nature of data types transferred to compute subsequent reputation scores. Then, setting and dynamically adjusting reputation thresholds, leveraging reinforcement learning models that adapt to changing data patterns and external feedback. Thereafter, triggering violation flags when computed reputation scores breach the set thresholds.

In another embodiment, executing responsive protocols, both reactive and proactive, including activating system-generated alerts, using advanced heuristics to decide when to prompt the user based on perceived data transfer risks. Then, incorporating user feedback loops, wherein the system learns from consistent user actions to refine its alert and action mechanisms. Thereafter, conditionally allowing data transfers based on user input, utilizing advanced cryptographic techniques to safeguard data in transit, especially when a transfer is flagged but permitted by the user, and halting those not endorsed.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above about specific embodiments. However, the benefits, advantages, solutions to problems, and any component(s) that may cause any benefit, advantage, or solution to occur or become more pronounced are not to be construed as a critical, required, or essential feature or component of any or all the claims.

The invention claimed is:

1. A sensitive information disclosure prediction system for social media users, the system comprises:

at least one hardware processor; and a cloud server platform memory having program instructions stored thereon executable by the at least one hardware processor that, when executed, direct the at least one hardware processor to:

collect various facets of a data of a user, said data selected from a user-specific and profile-related information including personal preferences and a profile picture, and generate an information regarding interactions of social network sites (SNS) users including a visit duration, an information about users' friends, an activity data containing information that users shared and created on a website and a group data containing an information about each of a group user forms and takes part in;

extract features and selecting the features thereby splitting a dataset based on a certain threshold value(s) of the features using an Extra-Trees ensemble method;

calculate a sensitivity score of each of a split data;

classify the dataset into a rank selected from extremely sensitive, very sensitive, moderately sensitive, low sensitivity, and very low sensitive using the sensitivity score of each of the split data;

monitor outbound data transfers made by a computing device by a data loss prevention (DLP) agent running on the system and identify outgoing data transfers;

determine a first reputation score based on classification and a destination entity for a first outbound data transfer to a specified recipient entity, where the first outbound data transfer is a first data type from a plurality of data types, and determine a second outbound information move in light of grouping and objective substance, wherein the second outbound information move is a subsequent information kind of a majority of information types, and determine a first violation of a DLP policy by comparing the first reputation score to a reputation threshold, where the first violation is determined when the first reputation score is lower than the reputation threshold thereby determining a second violation of the DLP policy by comparing a second reputation score to the reputation threshold, with the second violation being identified when the second reputation score is lower than the reputation threshold; and carry out at least one of reporting actions or remedial actions in response to one of a first, second, or both violations that are found, wherein carrying out at least one of the reporting actions or remedial actions comprises:

a) generating an alert for approving or denying a particular first or second outbound data transfer;

b) obtaining user input for approving or denying a particular outbound data transfer; and c) permitting a separate outbound information move when a client endorses a particular outbound information move when the user denies the respective outbound data transfer, and preventing that particular outbound data transfer.

2. The system of claim 1, wherein feature selection and cut-off points are randomized in the Extra-Trees ensemble method, wherein the feature selection is used for obtaining a feature vector to train a support vector machine (SVM) model.

3. The system of claim 1, wherein the at least one hardware processor updates the first reputation score of the destination entity for the first data type based on the first reputation score and update second reputation score of the destination entity based on the second reputation score for a second data type thereby communicating with a network community service for sharing the first reputation score for the first data type and the second reputation score for the second data type.

4. The system of claim 1, wherein the first reputation score and the second reputation score is determined upon assigning a certain first data type and second data type to the data of a particular first outbound data transfer and second outbound data transfer and connecting the information to the destination entity thereby calculating the first reputation score and the second reputation score using the data type and a target entity; and wherein calculation of the first reputation score and the second reputation score requires tracking a number of DLP policy violations that are discovered through prior data transfers to the destination entity, wherein the first reputation score and the second reputation score are calculated based on the data type being transferred to the destination entity and a tracked number of discovered violations.

5. The system of claim 4, wherein the at least one hardware processor is further directed to:

calculate the first reputation score and the second reputation score upon determining whether the computing device is transmitting data to the destination entity for a first time;

determine whether a desired data type is sent to the target entity for the first time with a specific outbound data transfer;

determine whether an overall reputation score of the target entity is below a certain threshold; or determine whether the overall reputation score of the destination entity for a relevant data type is within a certain level.

6. The system of claim 1, wherein the data from each outbound data transfer is fed into one of several different categories, with each category representing a different type of data, wherein the user input is received from a client to characterize a majority of classifications, wherein one or more data-type reputation ratings is obtained for the destination entity for the plurality of data types, and an at least one overall reputation score of the destination entity from a network community service; and wherein an activity type is denied if a target public audience specified in a request falls outside of an access limits for the activity type, wherein an activity monitor provides a request response to a requestor indicating that the request is denied, in case the request is denied by the activity monitor, wherein the activity monitor does not provide a requesting party with a data entity with hen request is denied that falls under an indicated activity type.

7. The system of claim 6, wherein the at least one hardware processor is further directed to:

receive a user nomination for the activity type, wherein the activity type is being a classification of user-related activities for which activity data is collected;

allow the user to select from a predefined set of access restrictions an access restriction for accessing data entities of the activity type, wherein the access restriction defines a set of users and services that is capable of accessing data entities belonging to a respective activity type, wherein each of the data entities comprising a data record of an activity associated with the user, wherein the access restriction configured with a filter that filters a subset of the data entities associated with the activity type; and configure the activity monitor to grant access to data entities of the activity type.

8. The system of claim 6, wherein the at least one hardware processor is further directed to:

allow the user to define the activity type, and provides a user interface (UI) element configured to allow the user to select at least one activity type;

permit an automatic generation and formulation of a privacy profile, wherein the privacy profile showing suggested access limits for each selected activity category; and generate the privacy profile upon obtaining an activity record that corresponds to the data entity and evaluate the activity data to find a link thereby determining the privacy profile.

9. The system of claim 1, wherein the generating an alert for approving or denying a particular first or second outbound data transfer using the at least one hardware processor, wherein the at least one hardware processor is further directed to:

detect initiated outbound data transfers and categorize an initiated outbound data transfers as either first or subsequent data movements;

instantiate a notification for user interaction when an outbound data transfer is identified, wherein the notification offering a choice to approve or deny a detected transfer;

embed relevant data details within the notification, wherein the notification comprising a destination, a data type, and a timestamp, thereby furnishing users with information for informed decision-making;

capture and interpret a user's decision to approve or deny from the notification;

elevate an urgency of specific alerts and prioritize specific alerts based on defined criteria, wherein the defined criteria comprising a data size and a destination sensitivity;

engage with stored historical user decisions, using a history to refine and potentially pre-empt for alerts for repetitive and routine transfers;

upon receipt of a user decision, dispense a confirmation message reflecting a user's chosen action; and grant system administrators to delineate parameters and triggers for alert generation.

10. The system of claim 1, wherein the at least one hardware processor is further directed to:

determine the first outbound data transfer to derive the first reputation score based on the classification of a contained data, the destination entity receiving the first outbound data transfer, and a specific data type of the first outbound data transfer, selected from a predefined set of possible data types;

process a subsequent outbound data transfer to determine a second reputation score by considering the classification of a subsequent data, an intended endpoint or objective entity for the subsequent outbound data transfer, and associated data type of the second outbound data transfer, chosen from the predefined set of data types;

compare the first reputation score and the second reputation score to a predefined reputation threshold to identify potential violations of the data loss prevention (DLP) policy, marking a violation if reputation score is below a set threshold;

fetches real-time data for analysis and dynamically update the predefined set of data types to account for emerging data categories;

notify system administrators of detected DLP policy violations;

classify data in the subsequent outbound data transfer based on a hierarchical structure that weighs sensitivity and importance of data categories;

regulates the reputation threshold based on sensitivity requirements set by an organization;

log records of evaluated data transfers and detected violations;

map destination entities based on trust levels to influence a derivation of reputation scores;

present reputation scores and potential DLP policy violations and offer administrative controls for setting or adjusting thresholds via a user interface; and refine and improve an accuracy of reputation score calculations over time by integrating them with machine learning techniques.

11. The system of claim 1, wherein approving or denying the particular outbound data transfer by the at least one hardware processor, wherein the at least one hardware processor is further directed to:

identify outbound data transfers that necessitate user approval and subsequently generate an alert using modalities comprising pop-ups, system alerts and emails;

upon user interaction with a generated notification, visually represent details of an impending outbound data transfer, including a source of data, a destination entity, a data type, a volume or size, a timestamp;

present distinct user action options, recognize and add a destination to a list of trusted entities;

receive and interpret a user's chosen action and authorize or prohibit the outbound data transfer based on a selection by the user;

document and store every user decision, and built with a capability to use stored decisions for audit trails, user preference learning, or reference purposes;

furnish the user with a confirmation message corresponding to their action, providing statuses, wherein the statuses comprising a transfer in progress and a transfer stopped;

default to pre-set behaviors if a user remains indecisive within a designated timeframe; and adapt to user behaviors over time, optimizing system responses based on prior logged decisions.

12. The system of claim 1, wherein permitting the separate outbound information move using the at least one hardware processor, wherein the at least one hardware processor is further directed to:

detect and catalog separate outbound data movements initiated from within the system;

capture a user decision related to an identified outbound data transfers and solicit an endorsement and denial of a particular outbound data movement;

analyze the user's decision, wherein the user endorses a particular outbound data transfer, the at least one hardware processor authorizes a progression of that respective data movement, and conversely, upon user denial, and instantaneously halts and prevents the particular outbound data transfer;

capture, record, and store each user decision concerning outbound data transfers, thereby built to offer insights and provide a traceable record for both endorsed and denied data transfer requests;

provide feedback to the user or system administrator concerning issues preventing an execution of the user's decision;

monitor and log a status of outbound data transfers, and ensure that only user-endorsed transfers proceed while denied transfers remain halted or terminated; and provide the user with a timely confirmation message that mirrors their decision, delivering real-time statuses, wherein the real-time statuses comprising a transfer approved and a transfer denied.

13. A sensitive information disclosure prediction method for social media users, the method comprises:

collecting various facets of a user data selected from a user-specific and profile-related information including personal preferences and a profile picture, generating an information regarding interactions of social network sites (SNS) users including a visit duration, an information about users' friends, an activity data containing information that users shared and created on a website, and a group data containing information about each of a group user forms and takes part in;

extracting features and selecting the features thereby splitting a dataset based on a certain threshold value(s) of the features using an Extra-Trees ensemble method;

calculating a sensitivity score of each of a split data using a machine learning technique;

classifying the dataset into a rank selected from extremely sensitive, very sensitive, moderately sensitive, low sensitivity, and very low sensitive using the sensitivity score of each of the split data;

monitoring outbound data transfers made by a computing device by a data loss prevention (DLP) agent and identifying outgoing data transfers as one of several different data types;

determining a first reputation score based on a classification and a destination entity for a first outbound data transfer to a specified recipient entity, where the first outbound data transfer is a first data type from a plurality of data types, and determining a second outbound information move in light of a grouping and an objective substance, wherein the second outbound information move is a subsequent information kind of a majority of information types, and determining a first violation of a DLP policy by comparing the first reputation score to a reputation threshold, where the first violation is determined when the first reputation score is lower than the reputation threshold thereby determining a second violation of the DLP policy by comparing a second reputation score to the reputation threshold, with the second violation being identified when the second reputation score is lower than the reputation threshold; and carrying out at least one of a reporting actions or remedial actions in response to first, second, or both violations that are found, wherein carrying out at least one of the reporting actions or remedial actions comprising steps of:

a) generating an alert for approving or denying a particular first or second outbound data transfer;

b) obtaining user input for approving or denying a particular outbound data transfer; and c) permitting a separate outbound information move when a client endorses a particular outbound information move when the user denies the respective outbound data transfer, and preventing that particular outbound data transfer.

14. The method of claim 13, further comprising:

accessing a user's profile on a social network site (SNS) and initiating data collection by fetching profile metadata, including user-defined preferences;

capturing graphical data, specifically analyzing and extracting feature vectors from the profile picture;

logging user activity metrics and visit duration;

crawling and indexing user's friends' profiles to obtain relational data;

capturing posts, comments, likes, and shares to generate a user interaction dataset; and iterating through user's group associations, detailing groups joined, content shared within them, and engagement metrics.

15. The method of claim 13, further comprising:

enhancing data utility and privacy by implementing the Extra-Trees ensemble method for high-dimensional data to break down user datasets;

analyzing a constructed feature space to determine and extract feature vectors; and dividing the dataset based on computed threshold values of significant features.

16. The method of claim 13, further comprising:

elevating privacy measures by assigning a sensitivity score to data fragments leveraging machine learning techniques, emphasizing differential privacy techniques;

balancing between raw sensitive data from the SNS and a weighted importance assigned by the user to their data;

isolating features capable of direct user identification or tagged as highly sensitive; and utilizing semantic transformation techniques to modify less sensitive features, ensuring data integrity and reduced privacy concerns.

17. The method of claim 13, further comprising:

engaging an optimized Support Vector Machine (SVM) model for multi-category classification; and assigning sensitivity labels ranging from "extremely sensitive" to "very low sensitive" based on sensitivity scores.

18. The method of claim 13, wherein monitoring data transfers in real-time by:

invoking a data loss prevention (DLP) agent to scrutinize outbound data packets; and employing deep packet inspection to categorize the data being transferred as per a predefined set of data type categories.

19. The method of claim 13, further comprises strategizing data transfer safety by:

computing reputation scores using neural network models based on data classification and the destination entity;

analyzing historical data transfers, based on frequency and nature of data types transferred to compute subsequent reputation scores;

setting and dynamically adjusting reputation thresholds, leveraging reinforcement learning models that adapt to changing data patterns and external feedback; and triggering violation flags when computed reputation scores breach set thresholds.

20. The method of claim 13, further comprises executing responsive protocols, both reactive and proactive, including:

activating system-generated alerts, using heuristics to decide when to prompt the user based on data transfer risks;

incorporating user feedback loops, wherein the system learns from user actions to refine its alert and action mechanisms; and conditionally allowing data transfers based on user input, utilizing cryptographic techniques to safeguard data in transit, when a transfer is flagged but permitted by the user, and halting those not endorsed.

* * * * *